July 28, 1970  R. A. PETERSON ET AL  3,521,782
SWINGING BUCKET LOADER

Filed Nov. 14, 1968  7 Sheets-Sheet 4

INVENTORS
ROBERT A. PETERSON
ROBERT N. STEDMAN
BY
ATTORNEYS

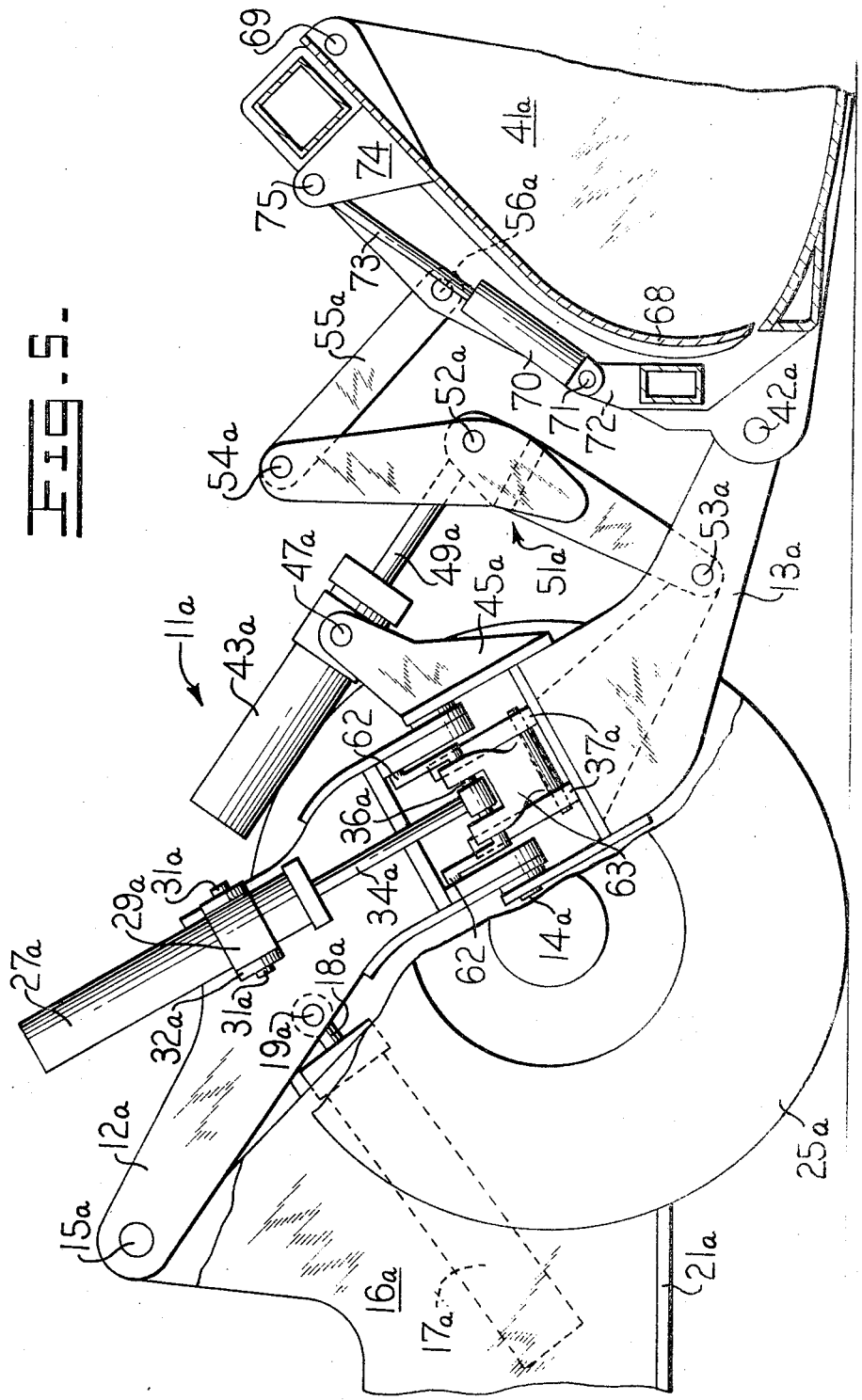

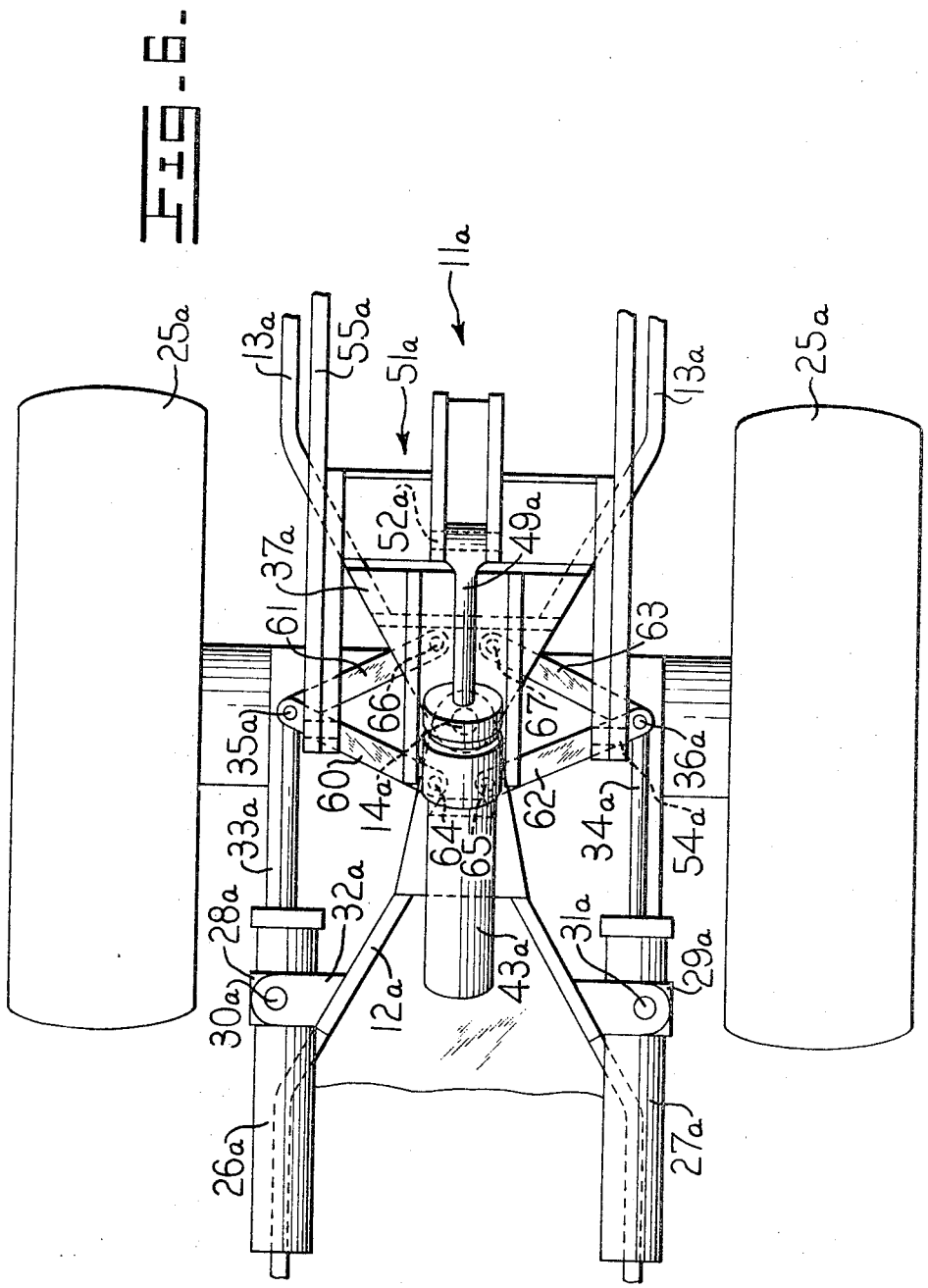

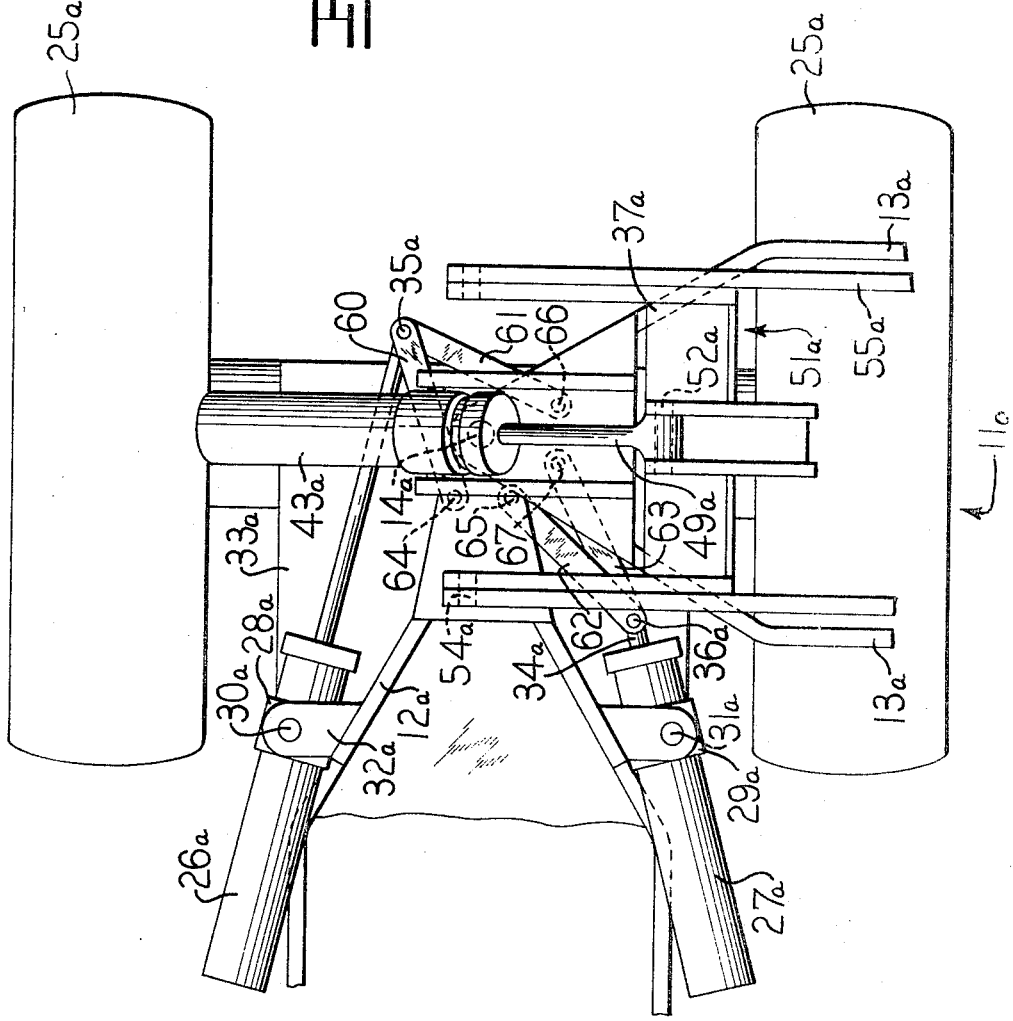

United States Patent Office 3,521,782
Patented July 28, 1970

3,521,782
SWINGING BUCKET LOADER
Robert A. Peterson, San Leandro, Calif., and Robert N. Stedman, Chillicothe, Ill., assignors to Caterpillar Tractor Co., Peoria, Ill., a corporation of California
Filed Nov. 14, 1968, Ser. No. 784,983
Int. Cl. E02f 3/70
U.S. Cl. 214—768                                11 Claims

ABSTRACT OF THE DISCLOSURE

A loader comprises an articulated lift arm having a rear section pivotally mounted for vertical movements on a tractor. A loader bucket is pivotally mounted on a forward end of the lift arm's front section for earth loading purposes. Actuating means are provided for pivoting the front section laterally relative to the rear section to discharge a load from the bucket to either side of the tractor.

---

Conventional loaders of the forward loading type must be constantly maneuvered during earth loading and unloading operations. Such maneuvering consumes approximately twenty-five to forty percent of the operation's total cycle time. Oftentimes the loader is found incapable of operating in close quarters due to the insufficient space provided for maneuvering purposes. In addition, constant maneuvering subjects loader components such as its tires or tracks to undue wear and need for premature replacement. Typical solutions to such problems comprise the utilization of an ejector bucket, a bucket mounted on the loader for side as well as forward dumping or a bucket mounted on an articulated lift arm to swing the bucket laterally for unloading purposes.

An object of this invention is to provide an improved swinging bucket arrangement for loaders of the latter type wherein the bucket is pivotally mounted on the front section of an articulated lift arm. A novel aspect of this invention comprises a pair of hydraulically actuated cylinders pivotally connected in a fixed manner between the lift arm's front and rear sections for selectively swinging the front section laterally relative to the rear section. Such a non-complex and efficient bucket arrangement exhibits a high degree of structural integrity, stabilizes the loader during earth loading and unloading operations and eliminates the need for complex interlocks and associated hardware normally prone to mechanical failure.

Another object of this invention comprises the combination of a swinging bucket loader with an ejecting means movably mounted in the bucket. Such combination increases loader efficiency whereby work may be performed economically and expeditiously. For example, when the front section of the loader's lift arm is pivoted sideways with the lift arm raised the ejecting means may be actuated to positively discharge a load from the bucket. The preferred ejecting means comprises an ejector blade pivotally mounted in the bucket and a hydraulically actuated cylinder for moving the blade.

Other objects of this invention will become apparent from the following description and accompanying drawings wherein:

FIG. 5 is a partial, side elevational view of a second swinging bucket loader embodiment;

FIG. 6 is a top elevational view of the FIG. 5 loader with various components thereof removed for clarification purposes and with the lift arm thereof shown in its raised position of operation; and FIG. 7 is a top elevational view of the FIG. 5 loader with the swinging bucket arrangement shown actuated to pivot the bucket to one side of the loader.

Figure 1:
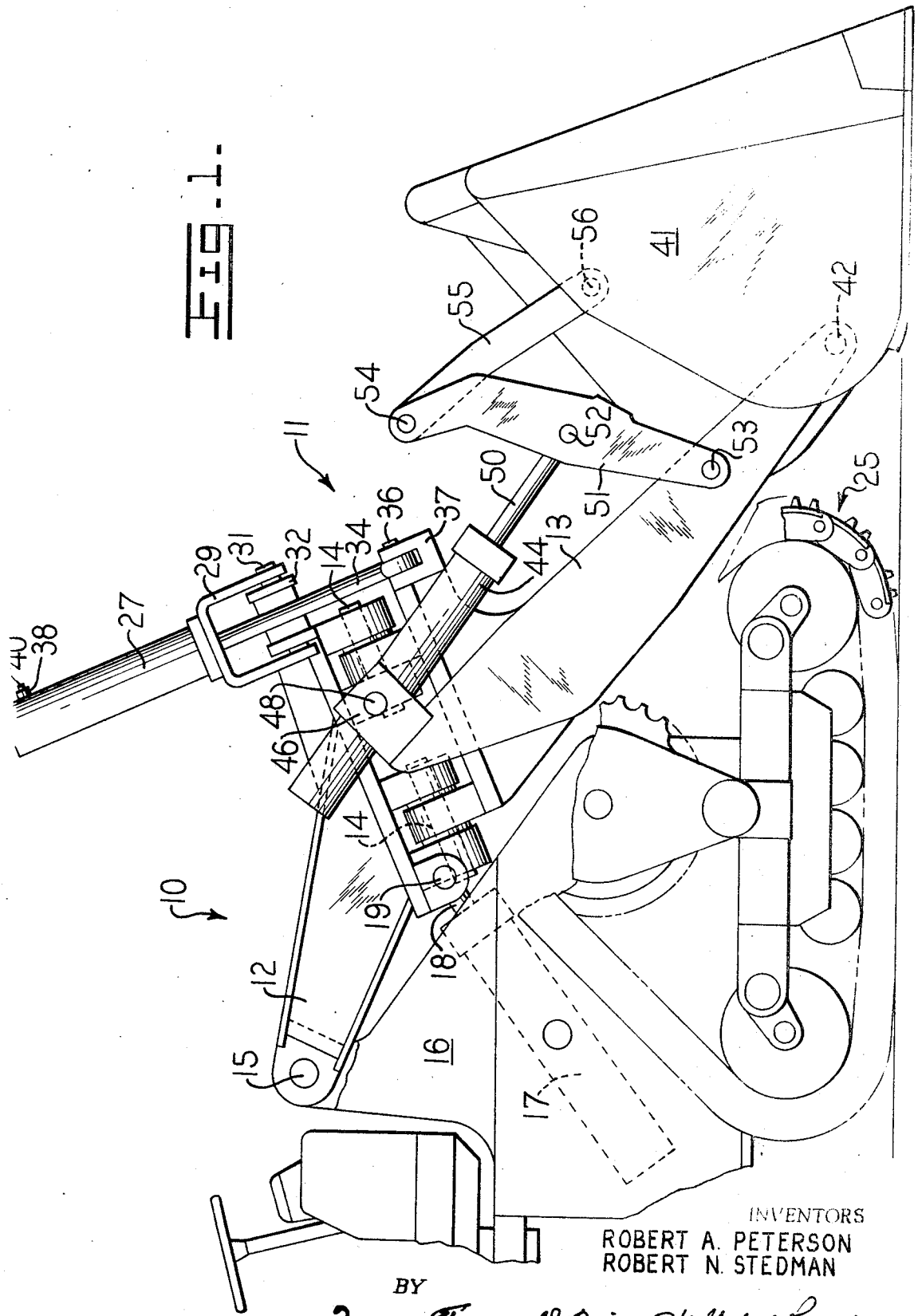
FIG. 1 is a partial, side elevational view of a loader comprising a swinging loader bucket arrangement attached to a track-type tractor.
Figure 2:
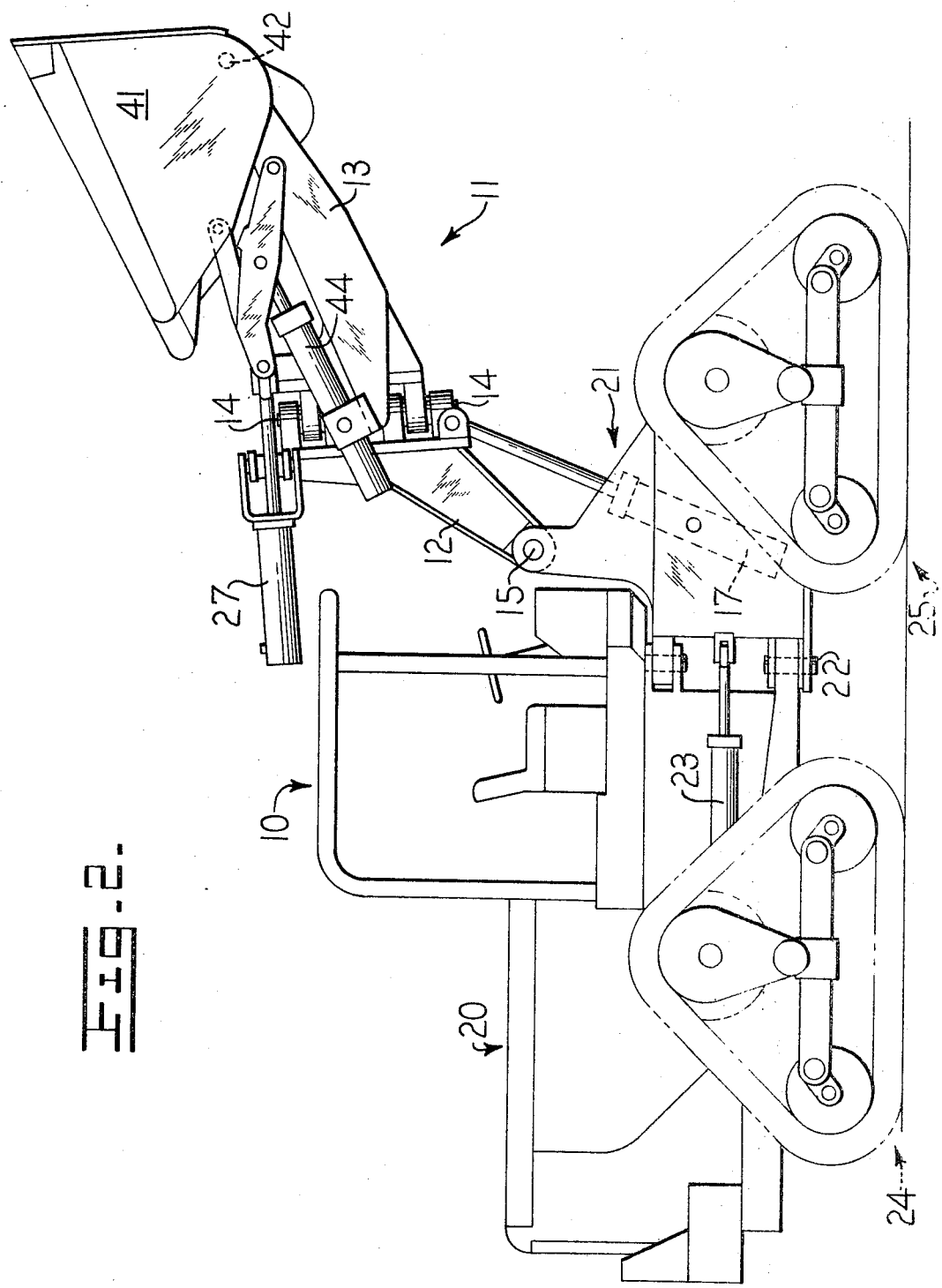
FIG. 2 is a side elevational view of the loader with the swinging loader bucket arrangement shown in its raised position of operation.
Figure 3:
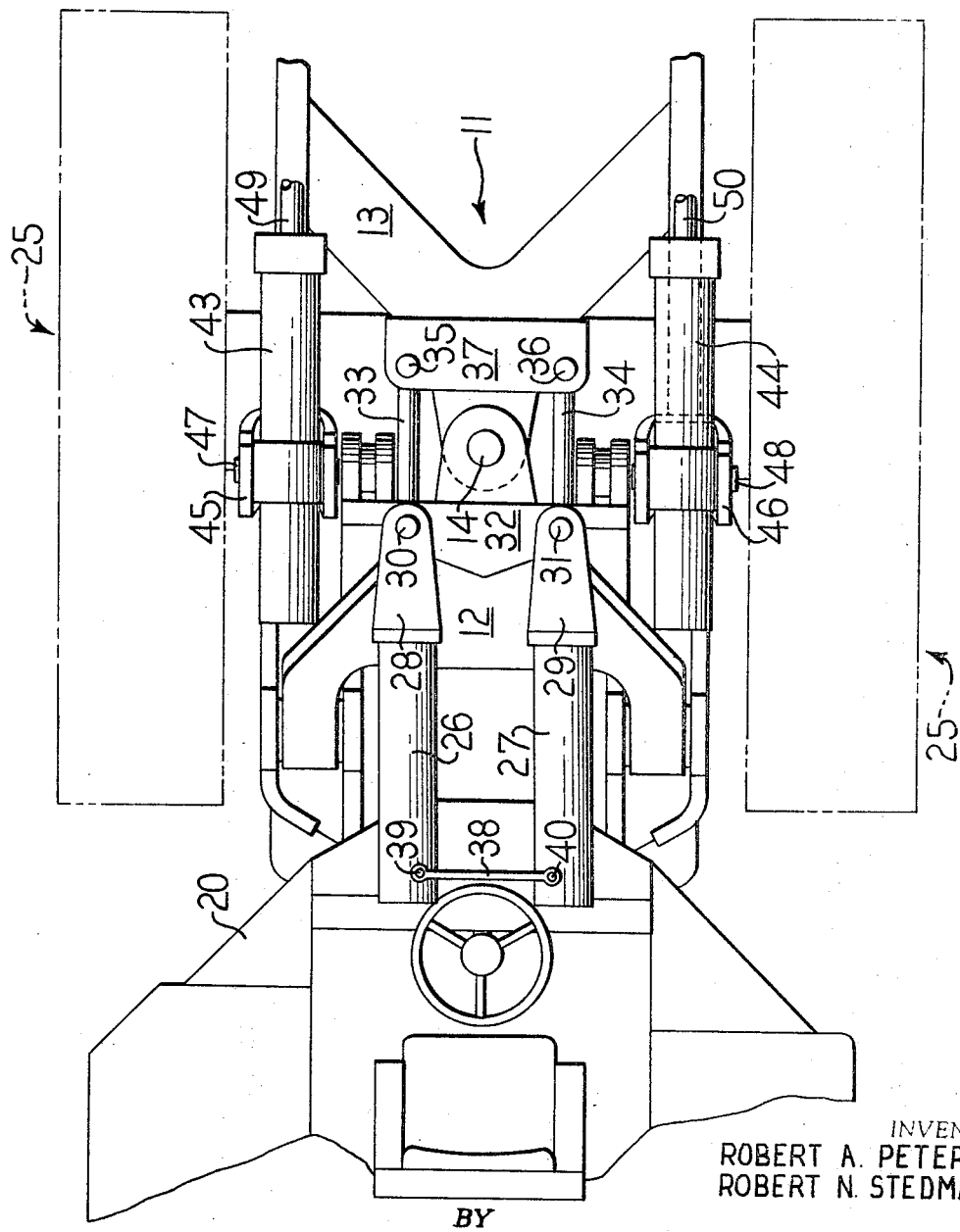
FIG. 3 is a partial, top elevational view of the loader with the bucket and attendant components removed for clarification purposes.
Figure 4:
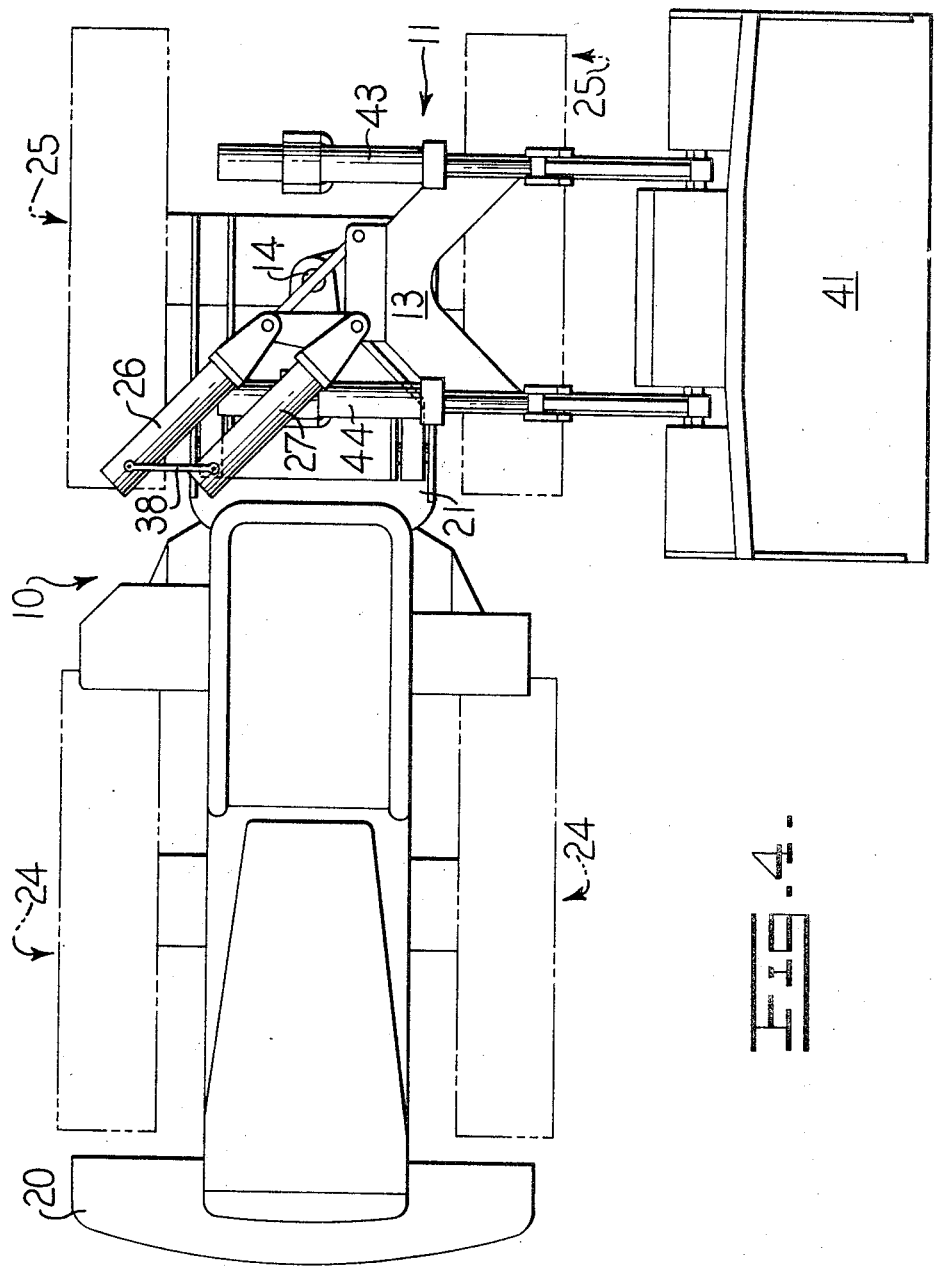
FIG. 4 is a top elevational view of the loader with the swinging bucket arrangement shown actuated to pivot the bucket to one side of the loader.

FIGS. 1–4 illustrate a loader comprising a track-type tractor 10 having a swinging bucket arrangement 11 attached thereto for earthmoving and loading purposes. It should be understood that the bucket may be attached to a wheel-type tractor or any other suitable machine. The bucket arrangement comprises an articulated boom having a rear section 12 pivotally attached to a front section 13 by pivot means or aligned shafts 14 substantially disposed in a vertical plane containing the loader's longitudinal axis. A transversely disposed pivot pin 15 mounts rear section 12 on an upstanding bracket 16 of the tractor to facilitate vertical movements of the lift arm.

Such vertical movements may be imparted to the lift arm by a double-acting, hydraulically actuated cylinder 17 (FIG. 2) pivotally mounted on the tractor and having its rod 18 attached to rear section 12 by a pivot pin 19. The tractor preferably comprises a rear section 20 articulated to a front section 21 by a vertically disposed pivot means or shaft 22. Double-acting hydraulically actuated steering cylinders 23 (one shown) are pivotally connected between the front and rear sections to selectively pivot them relative to each other. The sections are preferably mounted on separate pairs of tracks 24 and 25, respectively, although the tractor may be mounted on wheels if so desired.

The bucket arrangement further comprises actuating means preferably in the form of double-acting, hydraulically actuated first and second cylinders 26 and 27 (FIG. 3) having bifurcated brackets 28 and 29, respectively, attached to the casings thereof. The brackets are pivotally mounted by pivot means or pins 30 and 31, respectively, to a cross-member 32 secured to lift arm section 12. Cylinder rods 33 and 34 extend through the cross-member and are pivotally attached by respective pins 35 and 36 directly to a bifurcated bracket 37 secured to front lift arm section 13. Tie rod means 38 (FIG. 3) may be pivotally mounted to the casings of cylinders 26 and 27 by pivot pins 39 and 40, respectively.

Thus it can be seen that upon selective extension of cylinder 26 and simultaneous retraction of cylinder 27 (FIG. 4) by suitable operator actuated control means (not shown) that front lift arm section 13 will pivot clockwise about shaft 14 and laterally relative to the rear section. During such movement cylinders 26 and 27, bracket 32 and tie rod 38 function as a parallelogram-type linkage for precisely effecting such movement. In particular, the cylinders as well as bracket 32 and tie rod 38 remain parallel relative to each other under all conditions of loader operation. It should be noted that the independent first and second fixed connecting means, attaching respective cylinders between the lift arm's front and rear sections, are each totally located on a respective side of the loader's longitudinal axis.

A loader bucket 41 (FIG. 1) is pivotally attached by spaced pins 42 (one shown) to the forward end of front lift arm section 13 to be pivoted in the direction of the loader's longitudinal axis. The bucket tilting means or linkage may comprise laterally spaced hydraulic cylinders 43 and 44 of the double-acting type (FIG. 3) pivotally attached to respective brackets 45 and 46, secured to front lift arm section 13, by pivot pins 47 and 48. Cylinder rods 49 and 50 are each attached to the bucket in the same manner and therefore only the linkage attaching rod 50 to the bucket will be explained.

Rod 50 is pivotally attached to a lever 51 by a pin 52 with a pin 53 pivoting the lower end of the lever to section 13. A pin 54 pivotally mounts a link 55 to the upper end of the lever with a pin 56 pivotally mounting the link to the bucket. Thus it can be seen that selective extension or retraction of cylinder 44 by suitable control means (not shown) will function to actuate lever 51 and link 55 to pivot the bucket clockwise or counterclockwise (FIG. 2) about pivot pin 42.

FIGS. 5–7 illustrate a second loader embodiment employing features of this invention therein. Numerals common to those shown in FIGS. 1–4 depict like structures with the common numerals employed for describing the FIGS. 5–7 embodiment being accompanied by subscript a. The loader comprises a wheel-type tractor having a swinging bucket arrangement 11a attached thereto for earthmoving and loading purposes. Although the bucket arrangement is shown as attached to a wheel-type tractor it should be understood that it may be attached to a track-type tractor or any other suitable machine.

The bucket arrangement comprises an articulated lift arm having a rear section 12a pivotally attached to a front section 13a by pivot means or aligned shafts 14a substantially disposed in a vertically disposed plane containing the longitudinal axis of the loader. A transversely disposed pivot pin 15a mounts the rear section on an upstanding bracket 16a of the tractor to facilitate vertical movements of the lift arm. Such movements may be imparted to the lift arm by a double-acting hydraulic cylinder 17a pivotally mounted on the tractor and having its rod 18a pivotally attached to section 12a by a pin 19a.

The Tractor preferably comprises a rear section articulated to a front section 21a by a vertically disposed pivot means 22a. Hydraulic steering cylinders (not shown) may be pivotally connected between the front and rear sections in a conventional manner to selectively pivot them relative to each other for steering purposes. Each section is mounted for movement on a pair of conventional wheels, such as wheels 25a which mount the front section thereon (FIG. 6).

The bucket arrangement further comprises double-acting hydraulic cylinders 26a and 27a having respective brackets 28a and 29a secured to the casings thereof. The connecting means for attaching the cylinders between the lift arm's sections comprise pivot means or pairs of pins 30a and 31a pivotally mounting the cylinder brackets to bifurcated brackets 32a secured to rear lift arm section 12a. Cylinder rods 33a and 34a are pivotally connected by common pins 35a and 36a, respectively, to pairs of links 60 and 61 and 62 and 63. Pins 64 and 65 pivotally connect links 60 and 62 to rear section 12a whereas pins 66 and 67 pivotally connect links 61 and 63 to bifurcated brackets 37a of the front section of the lift arm.

Such connection between the cylinders and the front and rear sections of the lift arm comprise one of the changes made to the FIGS. 5 and 6 embodiment over the FIGS. 1–4 embodiment. It can be seen that upon extension of cylinder 26a and simultaneous retraction of cylinder 27a that front section 13 will pivot clockwise about pivot shaft 14a (FIG. 7).

A loader bucket 41a is pivotally attached by spaced pins 42a (one shown) to the forward end of section 13a. The bucket linkage comprises a double-acting hydraulic cylinder 43a pivotally attached to a bifurcated bracket 45a secured to section 13a by a pivot pin 47a. A cylinder rod 49a is attached to a lever 51a by a pin 52a with a pin 53a pivoting the lower end of the lever on section 13a. A pin 54a pivotally mounts a link 55a to the upper end of the lever with a pin 56a pivotally mounting the link to the bucket. Selective extension or retraction of cylinder 43a will function to actuate lever 51a and link 55a to pivot the bucket about pivot pin 42a.

Another feature of this invention comprises ejecting means movably mounted in the bucket for selectively and positively discharging material therefrom. The ejecting means preferably comprises an ejector 68 (FIG. 5) pivotally mounted by spaced pins 69 (one shown) in the bucket to be selectively actuated by a double-acting cylinder 70. The cylinder's casing is pivotally mounted by a pin 71 to a lug 72 secured to the bucket. The cylinder's rod 73 is pivotally mounted on a lug 74 secured to the ejector by a pin 75.

We claim:

1. A swinging bucket arrangement adapted to be attached to a loader comprising
   an articulated lift arm disposed along a longitudinal axis thereof and having front and rear sections pivotally connected to each other by substantially vertically disposed pivot means for permitting said front section to swing laterally relative to said longitudinal axis and said rear section,
   a loader bucket pivotally mounted on a forward end of said front section for pivotal movements in the direction of said longitudinal axis,
   bucket tilting means operatively connected between said front section and said bucket for selectively pivoting said bucket relative to said front section, and
   first and second double-acting cylinders each pivotally attached between said front and rear sections by independent first and second fixed connecting means, respectively, with each connecting means attached to said front section being positioned to pivot about said pivot means whereby extension of one of said first and second cylinder means and simultaneous retraction of the other one of said cylinder means will function to swing said front section laterally relative to said longitudinal axis and said rear section 2. The invention of claim 1 further comprising tie rod means pivotally attached between said first and second cylinder means to positively retain them in substantial parallel relationship upon actuation thereof.

3. The invention of claim 1 wherein said first and second cylinder means and said first and second connecting means are operatively connected together to substantially form a parallelogram linkage for maintaining said cylinder means in substantial parallel relationship upon actuation thereof.

4. The invention of claim 1 wherein each of said first and second cylinder means comprises a casing and a rod reciprocally mounted in said casing and wherein each of said connecting means pivotally mounts a casing to said rear section and pivotally mounts a rod to said front section.

5. The invention of claim 4 wherein each of said rods is pivotally mounted directly on said front section by a pivot pin connection.

6. The invention of claim 4 wherein each of said connecting means comprises first and second links pivotally mounted at first ends thereof on said front and rear sections, respectively, and a common pivot pin connection pivotally mounting said rod to second ends of said first and second links.

7. The invention of claim 1 further comprising an articulated tractor comprising front and rear sections pivoted together on a substantially vertically disposed pivot means and means for pivoting the front section of said tractor relative to the rear section thereof and wherein the rear section of said lift arm is pivotally mounted for vertical movements on the front section of said tractor.

8. The invention of claim 7 wherein said tractor further comprises two pairs of endless tracks respectively mounting the front and rear sections of said tractor thereon.

9. The invention of claim 7 wherein said tractor further comprises two pairs of ground-engaging wheels respectively mounting the front and rear sections of said tractor thereon.

10. The invention of claim 1 further comprising ejecting means movably mounted in said bucket for selectively and positively discharging material therefrom.

11. The invention of claim 10 wherein said ejecting means comprises an ejector blade pivotally mounted in said bucket and means for selectively pivoting said ejector blade.

References Cited

UNITED STATES PATENTS

| 2,852,869 | 9/1958 | Beyerstedt | 214—676 X |
| 3,236,401 | 2/1966 | Wagner | 214—132 |

HUGO O. SCHULZ, Primary Examiner

U.S. Cl. X.R.

214—767